US006629231B1

(12) United States Patent
Lohman

(10) Patent No.: US 6,629,231 B1
(45) Date of Patent: Sep. 30, 2003

(54) SYSTEM AND METHOD FOR EFFICIENT REGISTER FILE CONVERSION OF DENORMAL NUMBERS BETWEEN SCALAR AND SIMD FORMATS

(75) Inventor: Jeffrey A. Lohman, Plano, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/477,496

(22) Filed: Jan. 4, 2000

(51) Int. Cl.[7] .............................................. G06F 9/302
(52) U.S. Cl. ......................................... 712/1; 708/513
(58) Field of Search ................................ 708/513, 518, 708/521, 525, 530, 542, 550, 673; 712/1

(56) References Cited

U.S. PATENT DOCUMENTS

| | | | | |
|---|---|---|---|---|
| 5,423,051 A | * | 6/1995 | Fuller et al. ................... | 712/7 |
| 5,822,579 A | * | 10/1998 | Wichman ................... | 712/245 |
| 5,940,311 A | * | 8/1999 | Dao et al. ................... | 708/204 |
| 6,275,838 B1 | * | 8/2001 | Blomgren et al. .......... | 708/501 |
| 6,378,067 B1 | * | 4/2002 | Golliver et al. ............. | 712/244 |
| 6,460,134 B1 | * | 10/2002 | Blomgren et al. .......... | 712/219 |
| 6,490,607 B1 | * | 12/2002 | Oberman ................... | 708/620 |
| 2002/0138539 A1 | * | 9/2002 | Pham ......................... | 708/671 |

OTHER PUBLICATIONS

"Computer Architecture: A Quantitative Approach," by John L. Hennessey and David A. Patterson, Morgan Kaufman, 1990, pp. A–1–A–66.

"IEEE Standard for Binary Floating–Point Arithmetic," ANSI/IEEE Std. 754–1985, The Institute of Electrical and Electronic Engineers, 1985.

"An Implementation Guide to Proposed Standard for Binary Floating–Point Arithmetic," Jerome T. Coonen, IEEE Computer, Jan. 1980, pp. 68–79.

"Pentium Processor User's Manual, vol. 3: Architecture and Programming Manual," Intel Corporation, 1994, pp 6–1–8–23.

"Intel Architecture MMX Technology: Programmer's Reference Manual," Intel Corporation, Mar. 1996.

* cited by examiner

*Primary Examiner*—Eric Coleman

(57) ABSTRACT

There is disclosed a pipelined floating point unit comprising: a) a first plurality of pipelined functional units for processing operands conforming to a single instruction-multiple data stream (SIMD) instruction set architecture (ISA); b) a second plurality of pipelined functional units for processing operands conforming to a scalar instruction set architecture (ISA); and c) a first format fault detection circuit associated with at least one of the first plurality of pipelined functional units for determining whether a first operand is a denormal number and, in response to the determination, generating a first fault signal. The first fault signal causes a number conversion circuit associated with the pipelined floating point unit to modify a significand and an exponent of at least one operand in a data register associated with the pipelined floating point unit to thereby convert the at least one operand to a denormal number.

33 Claims, 4 Drawing Sheets

US 6,629,231 B1

SYSTEM AND METHOD FOR EFFICIENT REGISTER FILE CONVERSION OF DENORMAL NUMBERS BETWEEN SCALAR AND SIMD FORMATS

TECHNICAL FIELD OF THE INVENTION

The present invention is directed, in general, to processing systems and, more specifically, to a microprocessor having a floating point unit capable of converting numbers between scalar and SIMD values.

BACKGROUND OF THE INVENTION

The demand for ever-faster computers requires that state-of-the-art microprocessors execute instructions in the minimum amount of time. Microprocessor speeds have been increased in a number of different ways, including increasing the speed of the clock that drives the processor, reducing the number of clock cycles required to perform a given instruction, implementing pipeline architectures, and increasing the efficiency at which internal operations are performed. This last approach usually involves reducing the number of steps required to perform an internal operation.

Efficiency is particularly important in the floating point unit of a microprocessor. In floating point representation, every number may be represented by a significand (or mantissa) field, a sign bit, and an exponent field. Although the size of these fields may vary, the IEEE-754 standard defines the most commonly used floating point notation and forms the basis for floating point units (FPUs) in x86 type processors. The IEEE-754 standard includes a single precision format, a single extended precision format, a double precision format, and a double extended precision format. Single precision format comprises 32 bits: a sign bit, 8 exponent bits, and 23 significand bits. Single extended precision format comprises 44 bits: a sign bit, 11 exponent bits, and 32 significand bits. Double precision format comprises 64 bits: a sign bit, 11 exponent bits, and 52 significand bits. Double extended precision format comprises 80 bits: a sign bit, 15 exponent bits, and 64 significand bits.

It can be advantageous in a load-store implementation of IEEE-754 to represent all numeric values contained in the register file in the floating point unit as properly rounded values in a proprietary internal format with range and precision exceeding the widest. supported IEEE-754 format parameters. One such proprietary format is disclosed in U.S. patent application Ser. No. 09/377,140, entitled "Formatting Denormal Numbers for Processing in a Pipelined Floating Point Unit," which is commonly assigned to the assignee of the present application. The disclosure of Application Serial No. 09/377,140 is hereby incorporated by reference into the present disclosure as if fully set forth herein. The internal proprietary format disclosed in U.S. patent application Ser. No. 09/377,140 comprises 93 bit: a sign bit, 17 exponent bits, and 70 significand bits, and a 5 bit tag field.

In some applications, it may be advantageous to utilize the internal proprietary format to store denormal values from single, double, or any precision with lesser range, as normal values in the extended range provided by this internal format. In "normal" floating point representation, it is assumed that the leading binary digit in the significand is always equal to 1. Since it is known to be equal to 1, the leading binary digit of the significand may, in some floating point representations, be omitted and the exponent value adjusted accordingly. Denormal values are ones which cannot be represented in normalized form (i.e., having the smallest possible exponent with a significand that is non-zero).

If an internal proprietary format is used to store denormal values as normal values in the extended range provided by the internal format and the register file of the FPU is also used to store single instruction-multiple data stream (SIMD) values SIMD implementation of integers (e.g., Intel MMX format) and to store IEEE-754 values (e.g., Intel streaming system extension (SSE) or AMD 3D-Now!), then a problem may occur if SIMD instructions are allowed to reference the results of scalar IEEE-754 instructions directly via the register file, without storing the scalar results to memory. The problem may occur because denormal IEEE-754 results are stored in the register file in normalized form, and that becomes visible to the SIMD instruction stream, which typically occupies the significand portion of the scalar IEEE-754 format(s). The programmer of the SIMD instruction stream (human or compiler) may be unaware of this non-standard but equivalent method of representing denormal numbers as normal within the CPU and therefore may not account for it in the SIMD program. This may produce non-equal and, possibly, incorrect results.

Therefore, there is a need in the art for improved microprocessor designs that are capable of converting denormal number representations between scalar and SIMD formats. More particularly, there is a need in the art for an improved floating point unit that provides an efficient conversion in the register file of denormal numbers between scalar and SIMD formats.

SUMMARY OF THE INVENTION

The limitations inherent in the prior art described above are overcome by the present invention which provides an improved pipelined floating point unit. In an advantageous embodiment of the present invention, the pipelined floating point unit comprises: a) a first plurality of pipelined functional units capable of processing operands conforming to a single instruction-multiple data stream (SIMD) instruction set architecture (ISA); b) a second plurality of pipelined functional units capable of processing operands conforming to a scalar instruction set architecture (ISA); and c) a first format fault detection circuit associated with at least one of the first plurality of pipelined functional units capable of determining whether a first operand is a denormal number and, in response to the determination, generating a first fault signal.

According to one embodiment of the present invention, the first fault signal causes a number conversion circuit associated with the pipelined floating point unit to modify a significand and an exponent of at least one operand in a data register associated with the pipelined floating point unit to thereby convert the at least one operand to a denormal number.

According to another embodiment of the present invention, the first format fault detection circuit determines the first operand is denormal by examining a tag field associated with the first operand.

According to still another embodiment of the present invention, the first format fault detection circuit further determines the first operand is denormal by determining if a most significant bit (MSB) of the first operand is set to Logic 1.

According to yet another embodiment of the present invention, the pipelined floating point unit further comprises a second format fault detection circuit associated with at least one of the second plurality of pipelined functional units capable of determining whether a second operand is a denormal number and, in response to the determination, generating a second fault signal.

According to a further embodiment of the present invention, the second fault signal causes a number conversion circuit associated with the pipelined floating point unit to modify a significand and an exponent of at least one operand in a data register associated with the pipelined floating point unit to thereby convert the at least one operand to a denormal number.

According to a still further embodiment of the present invention, the second format fault detection circuit determines the second operand is denormal by examining a tag field associated with the first operand.

According to a yet further embodiment of the present invention, the second format fault detection circuit further determines the second operand is denormal by determining if a most significant bit (MSB) of the second operand is set to zero.

According to another embodiment of the present invention, the second format fault detection circuit is further capable of determining whether the second operand is encoded as a single instruction-multiple data stream (SIMD) number and, in response to the determination, generating the second fault signal.

According to yet another embodiment of the present invention, the second format fault detection circuit determines the second operand is encoded as the SIMD number by examining a tag field associated with the second operand.

According to a further embodiment of the present invention, the second fault signal causes a number conversion circuit associated with the pipelined floating point unit to modify the tag field to indicate that the second operand is a scalar number.

Existing applications making use of both scalar and SIMD floating-point are typically coarse grained (i.e., instructions from each instruction set architecture (ISA) are rarely interleaved). In the case of Intel MMX instructions and 3D-Now! instructions, the use of results from the other instruction set architecture (ISA), scalar or SIMD, is not recommended, although it is implicitly defined by the use of double extended IEEE-754 format for the scalar instruction set architecture and the mapping of the MMX and SSE storage formats onto double extended.

The present invention first requires that the functional units implementing the SIMD ISA be able to identify the scalar IEEE-754 values that represent what would be a denormal number in any of the IEEE-754 formats utilized for that value in memory. In some processor designs provided by National Semiconductor Corporation, this is accomplished through the encoding of a value class as part of the proprietary internal format, wherein one possible encoding is denormal. This has been described in United States Patent Application Serial No. 09/377,140, previously incorporated by reference into the present disclosure.

The present invention also requires that the MSB of a scalar IEEE-754 be explicit, not implicit, which is the case in the internal format described in U.S. patent application Ser. No. 09/377,140. Thus, the functional units in the floating point unit can distinguish a denormal value stored in external format from a value in internal format. Therefore, a SIMD functional unit can detect and report an internal-to-external fault when it encounters a denormal operand in internal format (MSB set).

This fault can be used to activate an internal-to-external microcode fault handler that walks through the register file converting the values in all registers using an internal-to-external conversion primitive. A "primitive" is one of the plurality of arithmetic operations implemented by a functional unit in the FPU. A primitive can be utilized by microcode on a data value in, for example, one of the instruction set architectural registers of the stack. This conversion primitive performs the identity transformation for all values except denormals in internal format, which are then denormalized by shifting their significands to the right as a function of the exponent value until the resulting exponent is all zeroes. This conversion primitive is very similar to the primitive that performs store conversion from internal format into the widest external format, such as double extended format. Once all registers have been converted by the microcode fault handler, which can be done without branching and in a pipelined fashion, the SIMD ISA is resumed. By performing the conversion of all registers, the fault cannot reoccur in this instance of the SIMD instruction stream.

However, because all registers have been converted, if a subsequent scalar IEEE-754 instruction stream happens to reference these register file values, the register file values will be in the incorrect format, since there was by definition at least one denormal which would now be in external format if not subsequently overwritten. Therefore, in one embodiment of the present invention, the functional units implementing the scalar IEEE-754 ISA may also detect an external-to-internal fault when the functional units encounter a denormal in external format (MSB reset). This fault causes an external-to-internal microcode handler to walk through the register file converting all registers using an external-to-internal conversion primitive. This conversion primitive performs the identity transformation for all values except denormals in external format, which are then normalized by left shifting their significand and incrementing a constant exponent until the MSB is set. This conversion primitive is very similar to the primitive that performs load conversion from the widest external format into internal format. Once all registers have been converted by the microcode handler, pipelined without branches, the scalar ISA is resumed.

At the very limited cost of a fault detection circuit per function unit in the floating point unit (and some additional interconnect between the register file and the load and/or store conversion unit), identical results can be obtained for all instruction streams with only those performing non-recommended data transfers via the register file paying a performance penalty.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
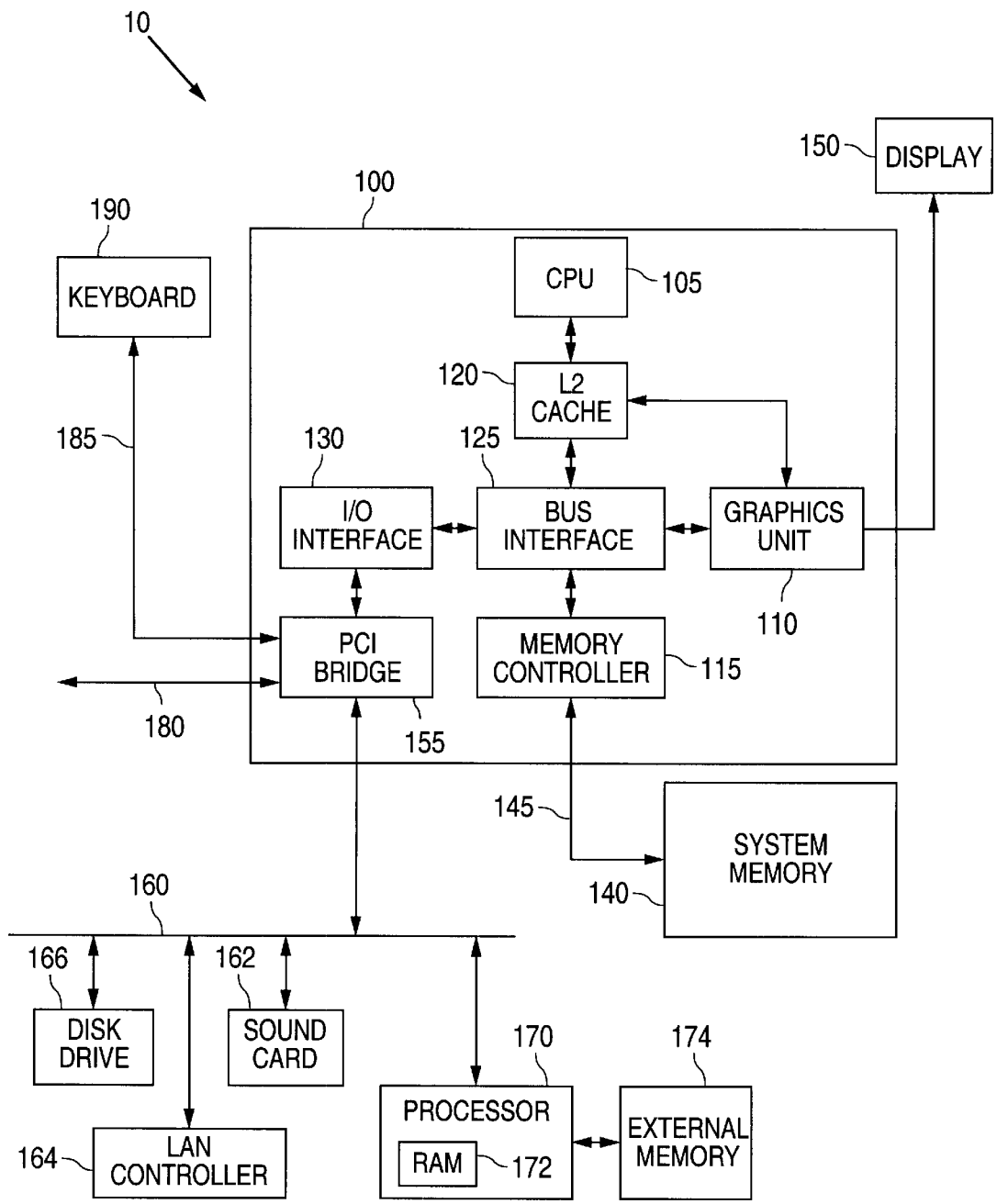
FIG. 1 is a block diagram of an exemplary processing system, which includes an integrated microprocessor according to one embodiment of the present invention.

FIG. 1 is a block diagram of processing system 10, which includes integrated microprocessor 100, according to one embodiment of the present invention. Integrated microprocessor 100 comprises central processing unit (CPU) 105, which has dual integer and dual floating point execution units, separate load/store and branch units, and L1 instruction and data caches. Microprocessor 100 also comprises graphics unit 110, system memory controller 115, and L2 cache 120, which is shared by CPU 105 and graphics unit 110. Graphics unit 110, system memory controller 115, and L2 cache 120 may be integrated onto the same die as microprocessor 105. Bus interface unit 125 connects CPU 105, graphics unit 110, and L2 cache 120 to memory controller 115. Bus interface unit 125 also may be integrated onto the same die as microprocessor 105.

Integrated memory controller 115 bridges microprocessor 100 to system memory 140, and may provide data compression and/or decompression to reduce bus traffic over external memory bus 145 which preferably, although not exclusively, has a RAMbus™, fast SDRAM or other type protocol. Integrated graphics unit 110 provides TFT, DSTN, RGB, and other types of video output to drive display 150.

Bus interface unit 125 connects microprocessor 100 through I/O interface 130 to PCI bridge 155, which has a conventional peripheral component interconnect (PCI) bus interface on PCI bus 160 to one or more peripherals, such as sound card 162, LAN controller 164, disk drive 166, and peripheral processor 170, among others. Bus interface unit 125 also connects fast serial link 180 and relatively slow I/O port 185 to microprocessor 100 (via I/O interface 130 and PCI bridge 155). Fast serial link 180 may be, for example, an IEEE 1394 bus (i.e., "Firewire") and/or a universal serial bus ("USB"). I/O port 185 is used to connect peripherals to microprocessor 100, such as keyboard 190 and/or a mouse. In some embodiments, PCI bridge 155 may integrate local bus functions such as sound, disk drive control, modem, network adapter, and the like.

Peripheral processor 170 may be anyone of a wide variety of processing devices that may be implemented in processing system 10. For example, peripheral processor 170 may be a digital signal processor (DSP) that provides a capability for communicating with external devices, such as a digital subscriber line (DSL). Alternatively, peripheral processor 170 may be a dedicated microprocessor that performs only a limited set of function(s) and that is subordinate to microprocessor 100. Peripheral processor 170 may also be a microcontroller device or an ASIC circuit that is capable of executing instructions retrieved from a memory.

Figure 2:
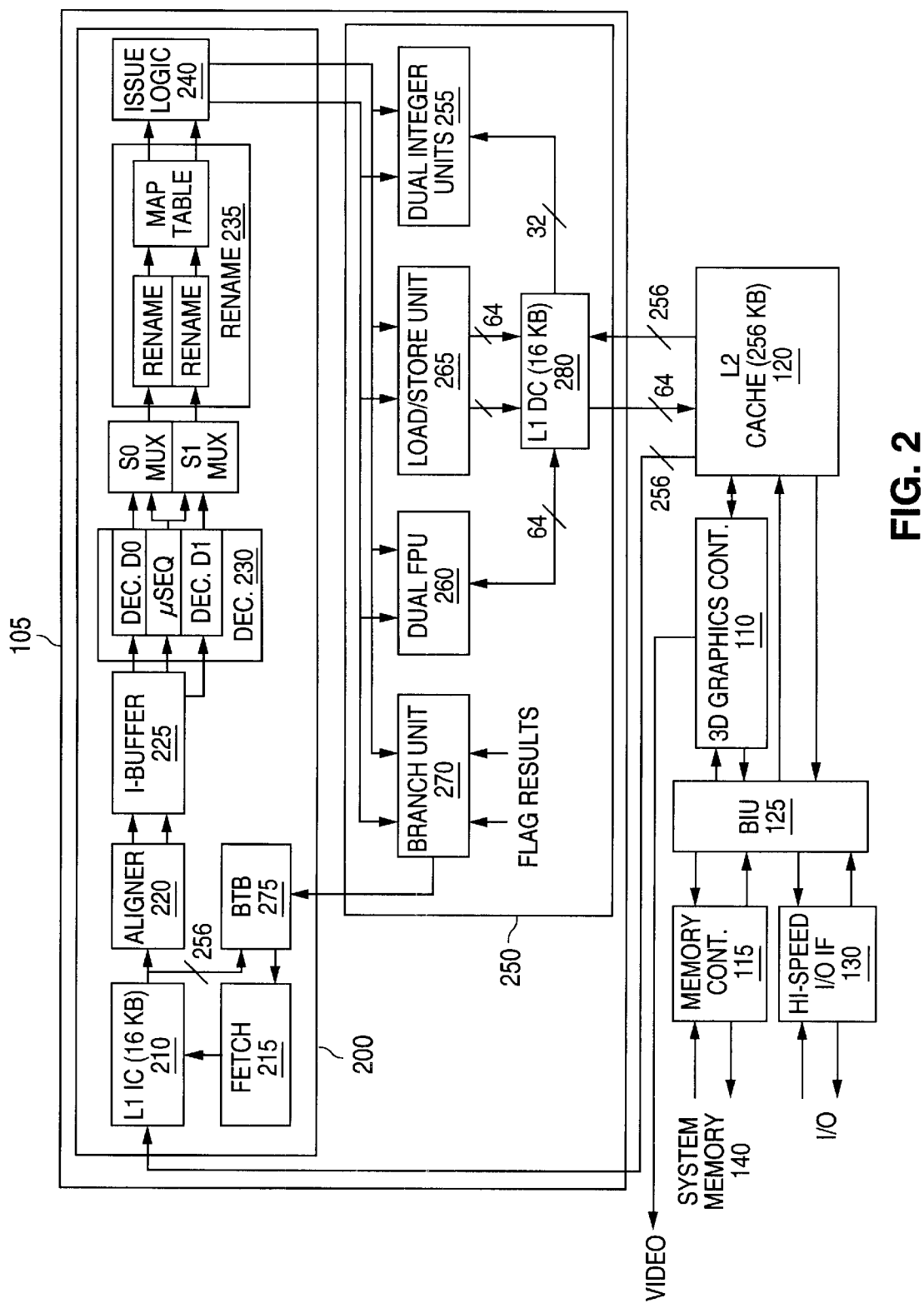
FIG. 2 illustrates in more detail the exemplary integrated processor in FIG. 1, including the CPU, graphics controller, memory controller, and L2 unified cache according to one embodiment of the present invention.

FIG. 2 illustrates in more detail exemplary integrated processor 100, including CPU 105, which is integrated with graphics controller 110, memory controller 115, and L2 unified cache 120 (e.g., 256 KB in size). CPU 105 includes an execution pipeline with instruction decode/dispatch logic 200 and functional units 250.

Instruction decode/dispatch logic 200 decodes variable length x86 instructions into nodes (operations) each containing source, destination, and control logic. Each instruction maps into one or more nodes, which are formed into checkpoints for issue in parallel to functional units 250. The exemplary execution pipeline includes dual integer units (EX) 255, dual pipelined floating point units (FP) 260, load/store (LDST) unit 265, and branch (BR) unit 270. Hence, a single checkpoint can include up to 2 EX, 2 FP, 1 LDST, and 1 BR nodes which can be issued in parallel. L1 data cache (DC) 280 (e.g., 16 KB in size) receives data requests from LDST unit 265 and, in the case of an L1 hit, supplies the requested data to appropriate EX or FP unit.

BR unit 270 executes branch operations based on flag results from the EX units. Predicted (taken/not-taken) and not-predicted (undetected) branches are resolved (mispredictions incur, for example, a 12 clock penalty) and branch information is supplied to BTB 275, including branch address, target address, and resolution (taken or not taken). BTB 275 includes a 1 KB target cache, a 7-bit history and prediction ROM, and a 16-entry return stack.

Instruction decode/dispatch logic 200 includes L1 instruction cache (IC) 210 (e.g., 16 KB in size) which stores 32-byte cache lines (8 dwords/4 qwords). Each fetch operation, fetch unit 215 fetches a cache line of 32 instruction bytes from the L1 instruction cache to aligner logic 220. Fetch unit 215 either (a) generates a fetch address by incrementing the previous fetch address (sequential fetch) or, (b) if the previous fetch address hit in BTB 275, switches the code stream by supplying the fetch address for the cache line containing the target address provided by BTB 275. Fetch unit 215 supplies a linear address simultaneously to L1 instruction cache 210 and BTB 275. A two-level translation look-aside buffer (TLB) structure (a 32-entry L1 instruction TLB and a 256-entry shared L2 TLB) supplies a corresponding physical address to the L1 cache to complete cache access.

Aligner logic 220 identifies up to two x86 variable length instructions per clock. Instructions are buffered in instruction buffer 225, along with decode and issue constraints. Decoder 230 transfers instructions from instruction buffer 225 to the appropriate one (as determined by decode constraints stored with the instruction) of decoders D0, D1, and uSEQ (a microsequencer). Decoders D0 and D1 define two decode slots (or paths) through MUX S0 and MUX S1, with the uSEQ decoder feeding nodes into both slots simultaneously.

Decoders D0 and D1 each decode single node EX/FPU/BR instructions that do not involve memory references (e.g., register-register integer and floating point operations and branch operations), while memory reference instructions, which decode into separate EX/FP and LDST nodes (e.g., register-memory integer and floating point operations), are constrained to decoder D0. The uSEQ decoder handles instructions that decode into more than two nodes/operations (e.g., far calls/returns, irets, segment register loads, floating point divides, floating point transcendentals). Each such sequence of nodes are organized into one or more separate checkpoints issued in order to the functional units. Renaming logic 235 (including a logical-to-physical map table) renames sources and destinations for each node, mapping logical to physical registers.

Issue logic 240 organizes the renamed nodes from each slot into checkpoints that are scheduled for issue in order to the functional units. Most instructions can be dual issued with the nodes for each in the same checkpoint. Up to 16 checkpoints may be active (i.e., issued to functional units). Nodes are issued into reservation stations in each functional unit. Once in the reservation stations, the nodes complete execution out-of-order.

The dual EX0/EX1 (integer) units 255 are pipelined with separate copies of a physical register file, and execute and forward results in a single cycle. The dual FPU0/FPU1 units 260 include dual execution units (with separate FP physical register files) that support Intel MMX and AMD 3DNow instructions, as well as standard x87 floating point, instruction execution. FPU0 includes a pipelined FAdder and FPU1 includes a pipelined Fmultipler, both supporting packed single instruction-multiple data streams (SIMD) operations.

Integer multiply operations are issued to FPU1 with the Fmultiplier, so that integer EX operations can execute in parallel with integer multiplies. Results are forwarded between EX0/EX1 and FPU0/FPU1 in a single cycle.

LDST unit 265 executes memory reference operations as loads/stores to/from data cache 280 (or L2 cache 120). LDST unit 265 performs pipelined linear address calculations and physical (paged) address translations, followed by data cache access with the physical (translated) address. Address translations are performed in order using a two-level TLB structure (a 32 entry L1 data TLB and the 256 entry shared L2 TLB). Up to four pending L1 misses can be outstanding. Missed data returns out of order (from either L2 cache 120 or system memory 140).

Exemplary 16 KB L1 instruction cache 210 is single-ported 4-way associative, with 2 pending misses. Exemplary 16 KB L1 data cache 280 is non-blocking, dual-ported (one load port and one store/fill port), 4-way associative, with 4 pending misses. Both L1 caches are indexed with the linear address and physically tagged with the TLB (translated) address. In response to L1 misses, L2 cache 120 transfers an entire cache line (32 bytes/256 bits) in one cycle with a 7 clock access latency for L1 misses that hit in L2 cache 120.

Exemplary 256 KB L2 cache 120 is 8-way associative and 8-way interleaved. Each interleave supports one L1 (code/data) miss per cycle, and either one L1 store or one L2 fill per cycle. Portions or all of 2 of the 8 ways may be locked down for use by graphics controller 110.

For integer register-to-register operations, the execution pipeline is eleven (11) stages from code fetch to completion: two cache access stages (IC1 and IC2), two alignment stages (AL1 and AL2), three decode/rename stages (DEC0–DEC2), checkpoint issue stage (ISS), and reservation stage (RS), followed by the execute and result writeback/forward stages (EX and WB). For integer register-memory operations, the LDST unit 265 pipeline adds an additional four stages between RS and EX: address calculation (AC), translation (XL), and data cache access and drive back DC and DB. The floating point adder pipeline comprises four stages and the floating point multiply pipeline comprises five stages.

Figure 3:
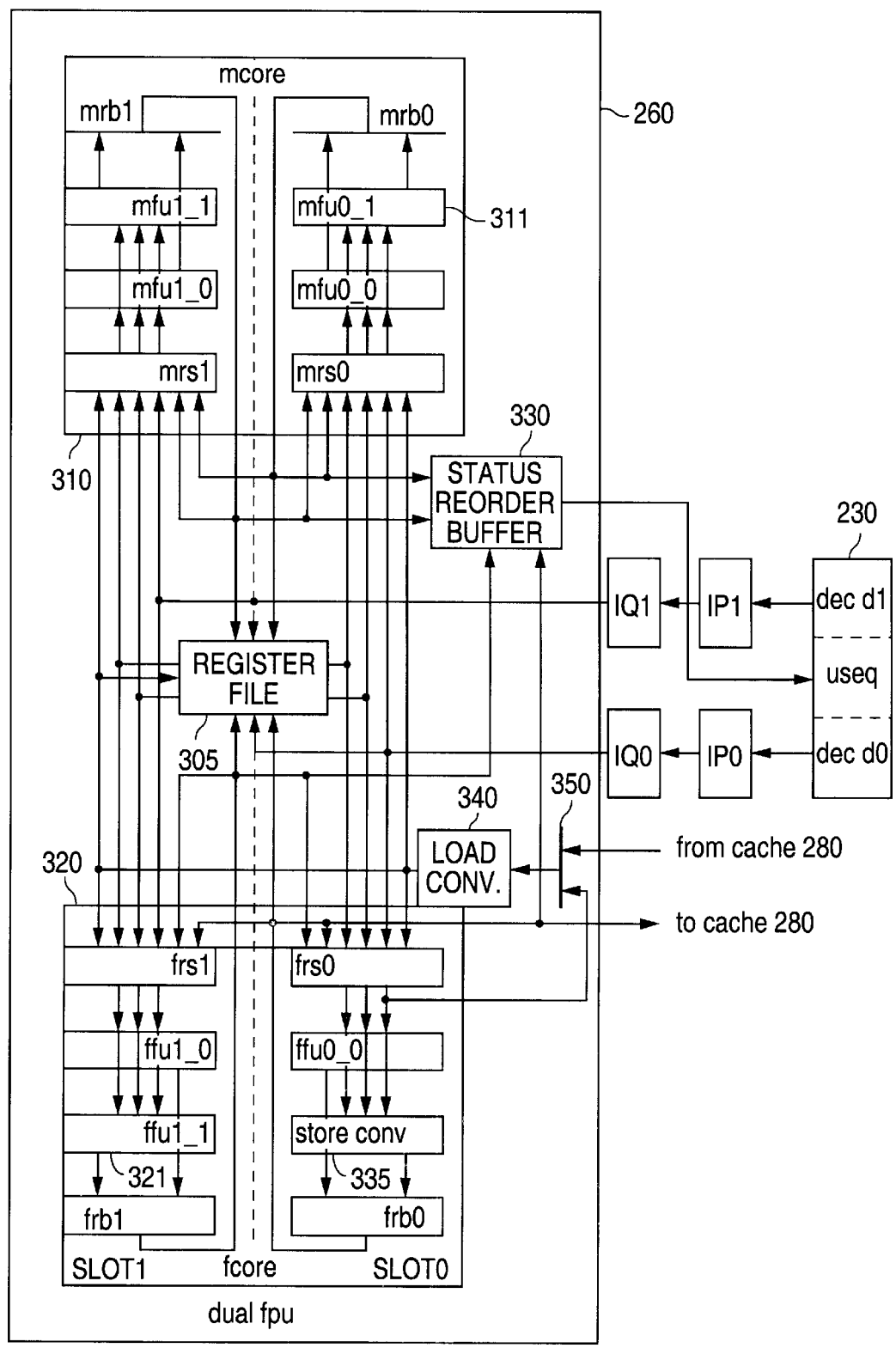
FIG. 3 is a block diagram of a representative floating point unit in the exemplary dual floating point unit according to one embodiment of the present invention.

FIG. 3 is a block diagram of selected portions of CPU 105, including dual FPU 260, according to one embodiment of the present invention. For the sake of brevity, the two instruction slots (or paths) provided by S0 MUX, S1 MUX, renaming logic 235, and issue logic 240 are collectively represented in simplified form as instruction pipe 0 (IP0) and instruction queue 0 (IQ0) for slot 0 and as instruction pipe 1 (IP1) and instruction queue 1 (IQ1) for slot 1.

FIG. 3 illustrates the primary components involved in detecting internal-to-external faults and external-to-internal faults. FPU 260 comprises functional units core 320 (labeled "FCORE") for implementing IEEE-754 instructions and MMX functional units core 310 (labeled "MCORE") for implementing SIMD instructions. Microsequencer uSEQ in decoder 230 may control FPU 260 by means of either an aligned instruction stream or a microcode sequence unrelated to an instruction, such as fault or trap handler. This pipelined control ultimately reaches FPU 260 where it is placed in two queues, IQ0 and IQ1, one for each issue slot of the aligned instruction stream or microsequence. Queue elements in IQ0 and IQ1 are removed from the bottom of these queues as items are scheduled out of the reservation stations FRS0, FRS1, MRS0 and MRS1 for both issue slots in FCORE and MCORE.

As these elements are transferred between queues IQO and IQ1 and reservation stations FRS0, FRS1, MRS0 and MRS1, the current value of their operands, if any, are obtained from register file 305. From reservation stations FRS0, FRS1, MRS0 and MRS1, instructions and operands are scheduled to the appropriate functional units in the FCORE and MCORE collection. The functional units in MCORE are MFU0_0, MFU0_1, MFU1_0, and MFU1_1. The functional units in FCORE are FFU0_0, FFU1_0, FFU1_1, and store conversion unit 335.

The outputs of the functional units in MCORE are transferred to two result buses, MRB0 and MRB1. The outputs of the functional units in FCORE are transferred to two result buses, FRB0 and FRB1. As part of their results, the functional units, in a pipelined manner detect internal-to-external faults in MCORE and external-to-internal faults in FCORE. For example, MCORE comprises exemplary format fault detection circuit 311, which is associated with functional unit MFU0_1. Similarly, FCORE comprises exemplary format fault detection circuit 321, which is associated with functional unit FFU1_1. Other fault detection circuits may be implemented in other functional units in MCORE and FCORE and may be associated with the result buses MRB0, MRB1, FRB0, and FRB1.

These detected faults, along with the other status related information, are transferred from the result buses to status reorder buffer 330. Status reorder buffer 330 serves as a central point for the collection of status information, which may appear out-of-order due to the out-of-order production of results from the pipelined functional units. Status reorder buffer 330 reorders the status information and reports it in order for the two oldest completed issue slots to microsequencer uSEQ. The status information indicates whether microsequencer uSEQ should continue issuing the current instruction stream speculatively or discard the current set of speculative results and transfer control to a microcode sequence for an exceptional condition. The status information also indicates what the microcode sequence should be.

In the case of an internal-to-external fault, the fault handler routine executed by uSEQ uses store conversion unit 335 in FCORE to convert all eight (8) instruction set architectural registers of the stack from internal-to-external format as described above. In the case of an external-to-internal fault, the corresponding fault handler uses load conversion unit 340 associated with FCORE to convert all eight (8) instruction set architectural registers of the stack from external-to-internal format. Because all speculative operations were discarded at the time either type of fault was detected, there can be no memory return data pending at multiplexer 350, so no structural hazard (e.g., collision) is possible at load conversion unit 340. It is noted that all functional units in FCORE and MCORE are pipelined, including those used to perform the necessary conversions. After all 8 registers have been converted, the instruction stream is restarted with the instruction detecting the fault.

In an exemplary embodiment of the present invention where the internal proprietary format disclosed in U.S. patent application Ser. No. 09/377,140 is used (i.e., 93 bit format including a sign bit, 17 exponent bits, 70 significand bits, and a 5 bit tag field), the following encoding may be used as part of the internal format and is stored in the register file as part of the value of all stack registers and accompanies all values as they move within FPU 260:

TABLE 1

Value Class Encoding

| Code | Value Class |
|---|---|
| 000 | SIMD |
| 001 | Intel IEEE-754 Unsupported |
| 010 | IEEE-754 NaN |
| 011 | IEEE-754 Infinity |
| 100 | IEEE-754 Denormal |
| 101 | IEEE-754 Pseudo-Denormal |
| 110 | IEEE-754 Zero |
| 111 | IEEE-754 Normal |

Then, detecting an internal-to-external fault may be done by examining each operand to see if the encoding is IEEE-754 Denormal with the explicit MSB of the significand being set to one. If this is the case for either operand, the corresponding MCORE functional unit signals the fault along with its result.

Similarly, detecting an external-to-internal fault may be done by examining each operand to see if the encoding is IEEE-754 Denormal with the explicit MSB of the significand being reset (equal to zero) or if the encoding is SIMD. If this is the case for either operand, the corresponding FCORE functional unit signals the fault along with its result.

By way of example, assume that the TOS (stack pointer) is 0 for simplicity. The 17-bit exponent and 70 bit significand are shown in hexadecimal. The example begins at the conclusion of an arbitrary sequence of IEEE-754 instructions with the following stack register contents:

TABLE 2

Initial State

| Register | Sign | Exponent | Significand | Class |
|---|---|---|---|---|
| 0 | 0 | 0_0000 | 00_0000_0000_0000_0000 | 110 |
| 1 | 0 | 0_FFFF | 20_0000_0000_0000_0000 | 111 |
| 2 | 0 | 0_C000 | 20_0000_0000_0000_0000 | 100 |
| 3 | 0 | 1_FFFF | 20_0000_0000_0000_0000 | 011 |
| 4 | 0 | 1_FFFF | 20_1000_0000_0000_0000 | 010 |
| 5 | 0 | 1_FFFF | 21_0000_0000_0000_0000 | 010 |
| 6 | 0 | 1_FFFF | 20_0000_0000_0000_0000 | 011 |
| 7 | 0 | 0_0000 | 00_0000_0000_0000_0000 | 110 |

There is a single denormal in register 2. The unbiased exponent is 49152 (C000in hexadecimal)−65535 (FFFF in hexadecimal−bias for internal format)=−16383, which is one less than the minimum representable normal number in 80-bit double extended, which is the external format in this embodiment. In that representation, the 15-bit exponent would be 0000 and 64-bit significand would be 4000_0000_0000_0000, both in hexadecimal. Note in this format, the MSB has been shifted right by 1 positions relative to internal format.

If the next instruction is an Intel MMX64-bit OR instruction (POR) over registers 1 and 2 writing the result to register 1, the instruction sets the resulting sign to 1, the exponent to all 1's, and the upper 64-bits of the significand to the result of logical bit-wise OR over the upper 64-bits of the operand significands, which in this case would be 20_0000_0000_0000_0000. This is not same as what would be produced by an Intel compatible processor, which would be 30_0000_0000_0000_0000, because stack register 2 would have its leading set bit shifted right by 1. Instead, the fault gives the following register contents after the fault handler converts all of the registers, which in this case will only alter register 2:

TABLE 3

After Internal-to-External Fault

| Register | Sign | Exponent | Significand | Class |
|---|---|---|---|---|
| 0 | 0 | 0_0000 | 00_0000_0000_0000_0000 | 110 |
| 1 | 0 | 0_FFFF | 20_0000_0000_0000_0000 | 111 |
| 2 | 0 | 0_0000 | 10_0000_0000_0000_0000 | 100 |
| 3 | 0 | 1_FFFF | 20_0000_0000_0000_0000 | 011 |
| 4 | 1 | 1_FFFF | 20_1000_0000_0000_0000 | 010 |
| 5 | 0 | 1_FFFF | 21_0000_0000_0000_0000 | 010 |
| 6 | 0 | 1_FFFF | 20_0000_0000_0000_0000 | 011 |
| 7 | 1 | 0_0000 | 00_0000_0000_0000_0000 | 110 |

After the completion of the resumed POR instruction, the stack would be:

TABLE 4

After POR Instruction

| Register | Sign | Exponent | Significand | Class |
|---|---|---|---|---|
| 0 | 0 | 0_0000 | 00_0000_0000_0000_0000 | 110 |
| 1 | 1 | 1_FFFF | 30_0000_0000_0000_0000 | 000 |

TABLE 4-continued

After POR Instruction

| Register | Sign | Exponent | Significand | Class |
|---|---|---|---|---|
| 2 | 0 | 0_0000 | 10_0000_0000_0000_0000 | 100 |
| 3 | 0 | 1_FFFF | 20_0000_0000_0000_0000 | 011 |
| 4 | 1 | 1_FFFF | 20_1000_0000_0000_0000 | 010 |
| 5 | 0 | 1_FFFF | 21_0000_0000_0000_0000 | 010 |
| 6 | 0 | 1_FFFF | 20_0000_0000_0000_0000 | 011 |
| 7 | 1 | 0_0000 | 00_0000_0000_0000_0000 | 110 |

Note that the significand in stack register 1 is now correct, but the class is SIMD which is not correct for an IEEE-754 instruction (the class is in fact NaN). However, all denormals in the stack are now in external format (and would be even if there had been more than one). Hence, subsequent SIMD instructions (without an intervening IEEE-754 instruction) will not cause another fault.

Now let us suppose the POR instruction is followed by any IEEE-754 instruction with either stack register 1 or 2 as an operand. Either one will trigger the external-to-internal fault (the former because of the SIMD class, the latter because of the Denormal class with MSB reset). After the completion of the external-to-internal fault, the stack would be:

TABLE 5

After External-to-Internal Fault

| Register | Sign | Exponent | Significand | Class |
|---|---|---|---|---|
| 0 | 0 | 0_0000 | 00_0000_0000_0000_0000 | 110 |
| 1 | 1 | 1_FFFF | 30_0000_0000_0000_0000 | 010 |
| 2 | 0 | 0_C000 | 20_0000_0000_0000_0000 | 100 |
| 3 | 0 | 1_FFFF | 20_0000_0000_0000_0000 | 011 |
| 4 | 1 | 1_FFFF | 20_1000_0000_0000_0000 | 010 |
| 5 | 0 | 1_FFFF | 21_0000_0000_0000_0000 | 010 |
| 6 | 0 | 1_FFFF | 20_0000_0000_0000_0000 | 011 |
| 7 | 1 | 0_0000 | 00_0000_0000_0000_0000 | 110 |

Two changes have occurred. Stack register 1 has been correctly classified as a NaN and stack register 2 has been reencoded properly in internal format and has its initial value again. This same state would have been reached regardless of which stack register triggered the fault. Subsequent IEEE-754 instructions would not cause the fault to reoccur until the next SIMD instruction.

Figure 4:
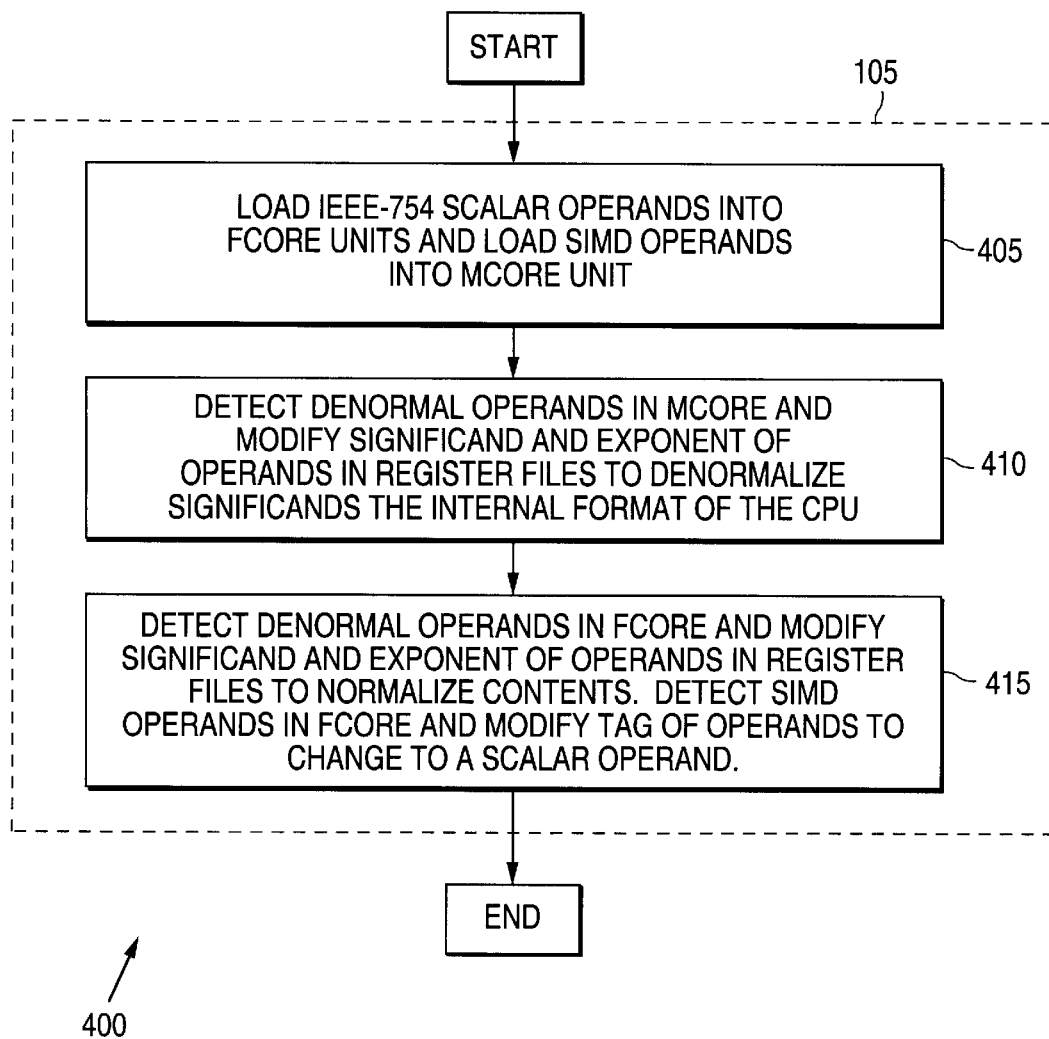
FIG. 4 is a flow chart illustrating the operation of the representative floating point unit according to one embodiment of the present invention.

FIG. 4 depicts flow chart 400, which illustrates in summary the operation of exemplary CPU 105 and floating point unit 260 according to one embodiment of the present invention. During normal operations, FPU 260 loads IEEE-754 compatible scalar operands and instructions into the functional units in FCORE and loads SIMD operands and instructions into the functional units in MCORE (process step 405). The format fault detection circuits in the functional units in MCORE detect denormal operands in which the MSB is set to Logic 1. This triggers an internal-to-external fault that causes microsequencer USEQ to modify the significand and exponent of values in the register files in order to denormalize the significand according to the internal format of CPU 105 (process step 410).

Similarly, the format fault detection circuits in the functional units in FCORE detect denormal operands in which the MSB is set to Logic 0 or an operand tag is SIMD. This triggers an external-to-internal fault that causes microsequencer uSEQ to modify the significand and exponent of values in the register files in order to normalize the significand of denormal values as well as recompute the tag of SIMD values from the contents of the exponent and significand fields according to the internal format of CPU 105 (process step 415).

Although the present invention has been described in detail, those skilled in the art should understand that they can make various changes, substitutions and alterations herein without departing from the spirit and scope of the invention in its broadest form.

What is claimed is:

1. A pipelined floating point unit comprising:
   a first plurality of pipelined functional units capable of processing operands conforming to a single instruction-multiple data stream (SIMD) instruction set architecture (ISA);
   a second plurality of pipelined functional units capable of processing operands conforming to a scalar instruction set architecture (ISA); and
   a first format fault detection circuit associated with at least one of said first plurality of pipelined functional units capable of determining whether a first operand is a denormal number and, in response to said determination, generating a first fault signal.

2. The pipelined floating point unit as set forth in claim 1 wherein said first fault signal causes a number conversion circuit associated with said pipelined floating point unit to modify a significand and an exponent of at least one operand in a data register associated with said pipelined floating point unit to thereby convert said at least one operand to a denormal number.

3. The pipelined floating point unit as set forth in claim 2 wherein said first format fault detection circuit determines said first operand is denormal by examining a tag field associated with said first operand.

4. The pipelined floating point unit as set forth in claim 3 wherein said first format fault detection circuit further determines said first operand is denormal by determining if a most significant bit (MSB) of said first operand is set to Logic 1.

5. The pipelined floating point unit as set forth in claim 1 further comprising a second format fault detection circuit associated with at least one of said second plurality of pipelined functional units capable of determining whether a second operand is a denormal number and, in response to said determination, generating a second fault signal.

6. The pipelined floating point unit as set forth in claim 5 wherein said second fault signal causes a number conversion circuit associated with said pipelined floating point unit to modify a significand and an exponent of at least one operand in a data register associated with said pipelined floating point unit to thereby convert said at least one operand to a denormal number.

7. The pipelined floating point unit as set forth in claim 6 wherein said second format fault detection circuit determines said second operand is denormal by examining a tag field associated with said first operand.

8. The pipelined floating point unit as set forth in claim 7 wherein said second format fault detection circuit further determines said second operand is denormal by determining if a most significant bit (MSB) of said second operand is set to Logic 0.

9. The pipelined floating point unit as set forth in claim 5 wherein said second format fault detection circuit is further capable of determining whether said second operand is encoded as a single instruction-multiple data stream (SIMD) number and, in response to said determination, generating said second fault signal.

10. The pipelined floating point unit as set forth in claim 9 wherein said second format fault detection circuit determines said second operand is encoded as said SIMD number by examining a tag field associated with said second operand.

11. The pipelined floating point unit as set forth in claim 10 wherein said second fault signal causes a number conversion circuit associated with said pipelined floating point unit to modify said tag field to indicate that said second operand is a scalar number.

12. A data processor comprising:
   at least one pipelined integer execution unit;
   a load and store execution unit; and
   at least one pipelined floating point unit comprising:
      a first plurality of pipelined functional units capable of processing operands conforming to a single instruction-multiple data stream (SIMD) instruction set architecture (ISA);
      a second plurality of pipelined functional units capable of processing operands conforming to a scalar instruction set architecture (ISA); and
      a first format fault detection circuit associated with at least one of said first plurality of pipelined functional units capable of determining whether a first operand is a denormal number and, in response to said determination, generating a first fault signal.

13. The data processor as set forth in claim 11 wherein said first fault signal causes a number conversion circuit associated with said pipelined floating point unit to modify a significand and an exponent of at least one operand in a data register associated with said pipelined floating point unit to thereby convert said at least one operand to a denormal number.

14. The data processor as set forth in claim 13 wherein said first format fault detection circuit determines said first operand is denormal by examining a tag field associated with said first operand.

15. The data processor as set forth in claim 14 wherein said first format fault detection circuit further determines said first operand is denormal by determining if a most significant bit (MSB) of said first operand is set to Logic 1.

16. The data processor as set forth in claim 12 further comprising a second format fault detection circuit associated with at least one of said second plurality of pipelined functional units capable of determining whether a second operand is a denormal number and, in response to said determination, generating a second fault signal.

17. The data processor as set forth in claim 16 wherein said second fault signal causes a number conversion circuit associated with said pipelined floating point unit to modify a significand and an exponent of at least one operand in a data register associated with said pipelined floating point unit to thereby convert said at least one operand to a denormal number.

18. The data processor as set forth in claim 17 wherein said second format fault detection circuit determines said second operand is denormal by examining a tag field associated with said first operand.

19. The data processor as set forth in claim 18 wherein said second format fault detection circuit further determines said second operand is denormal by determining if a most significant bit (MSB) of said second operand is set to Logic 0.

20. The data processor as set forth in claim 16 wherein said second format fault detection circuit is further capable of determining whether said second operand is encoded as a single instruction-multiple data stream (SIMD) number and, in response to said determination, generating said second fault signal.

21. The data processor as set forth in claim 20 wherein said second format fault detection circuit determines said second operand is encoded as said SIMD number by examining a tag field associated with said second operand.

22. The data processor as set forth in claim 21 wherein said second fault signal causes a number conversion circuit associated with said pipelined floating point unit to modify said tag field to indicate that said second operand is a scalar number.

23. A method of operating a pipelined floating point unit comprising the steps of:
   processing operands conforming to a single instruction-multiple data stream (SIMD) instruction set architecture (ISA)in a first plurality of pipelined functional units;
   processing operands conforming to a scalar instruction set architecture (ISA) in a second plurality of pipelined functional units; and
   determining whether a first operand associated with at least one of the first plurality of pipelined functional units is a denormal number; and
   in response to the determination, generating a first fault signal.

24. The method as set forth in claim 23 including the further step of modifying a significand and an exponent of at least one operand in a data register associated with the pipelined floating point unit to thereby convert the at least one operand to a denormal number.

25. The method as set forth in claim 24 wherein the step of determining the first operand is denormal comprises the substep of examining a tag field associated with the first operand.

26. The method as set forth in claim 25 wherein the step of determining the first operand is denormal comprises the further substep of determining if a most significant bit (MSB) of the first operand is set to Logic 1.

27. The method as set forth in claim 23 further comprising the steps of:
   determining whether a second operand associated with at least one of the second plurality of pipelined functional units is a denormal number; and
   in response to the determination, generating a second fault signal.

28. The method as set forth in claim 27 including the further step of modifying a significand and an exponent of at least one operand in a data register associated with the pipelined floating point unit to thereby convert the at least one operand to a denormal number.

29. The method as set forth in claim 28 wherein the step of determining the second operand is denormal comprises the substep of examining a tag field associated with the second operand.

30. The method as set forth in claim 29 wherein the step of determining the second operand is denormal comprises the further substep of determining if a most significant bit (MSB) of the second operand is set to Logic 0.

31. The method as set forth in claim 27 comprising the further steps of:
   determining whether the second operand is encoded as a single instruction-multiple data stream (SIMD) number; and
   in response to the determination, generating the second fault signal.

32. The method as set forth in claim 31 wherein the step of determining whether the second operand is encoded as a SIMD number comprises the substep of examining a tag field associated with the second operand.

33. The method as set forth in claim 32 including the further step of modifying the tag field to indicate that the second operand is a scalar number.

* * * * *